Aug. 31, 1954     C. L. PETCH ET AL     2,687,910
SNAP RING CONNECTION FOR CYLINDERS AND CYLINDER HEADS
Filed Jan. 18, 1949
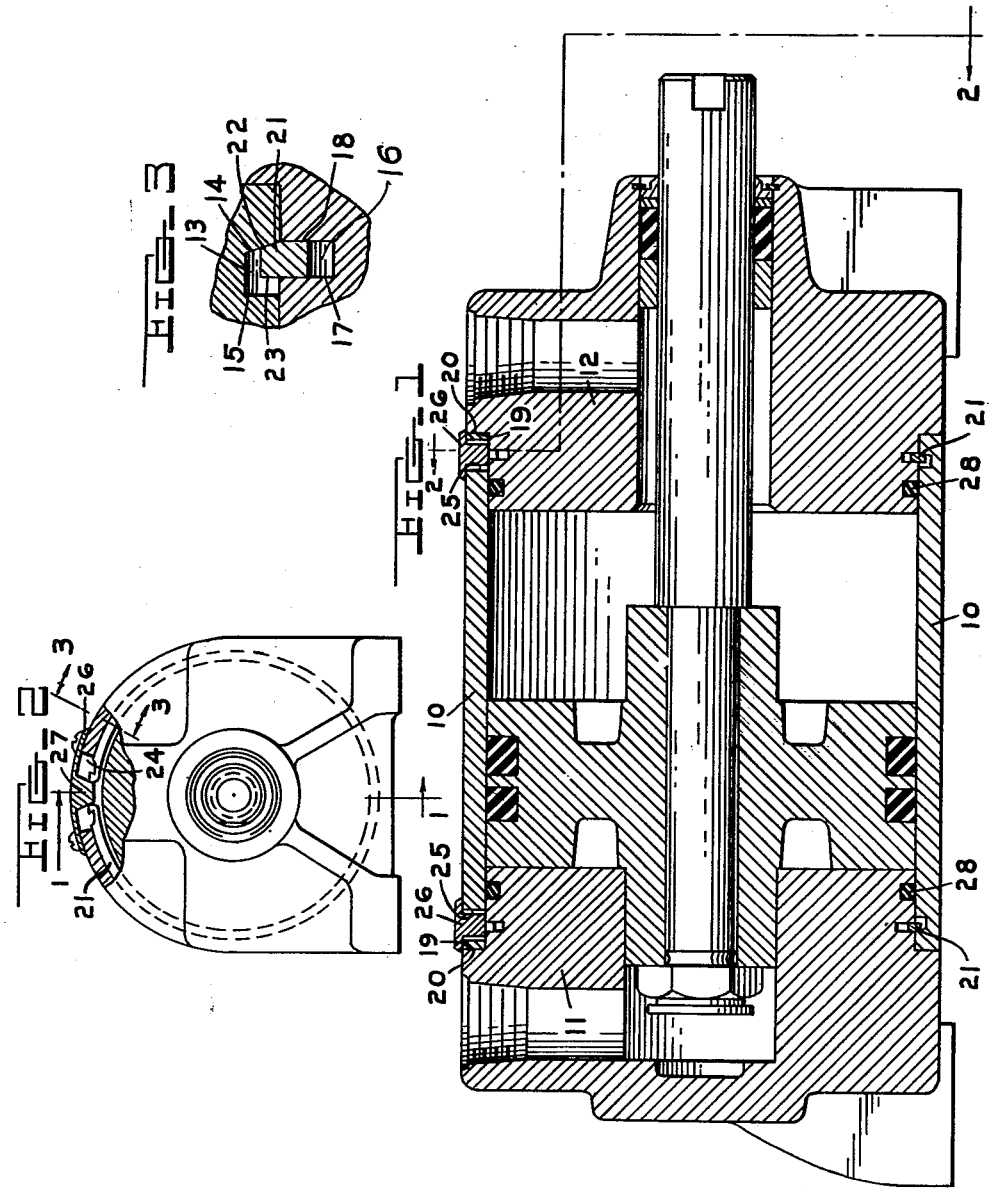
INVENTOR.
CHARLES L. PETCH
FREDERICK P. WARRICK
BY
ATTORNEYS Patented Aug. 31, 1954

2,687,910

UNITED STATES PATENT OFFICE 2,687,910

SNAP RING CONNECTION FOR CYLINDERS AND CYLINDER HEADS

Charles Lorenz Petch, Grosse Pointe, and Frederick Price Warrick, Detroit, Mich., assignors to Charles L. Petch, Grosse Pointe, Mich.

Application January 18, 1949, Serial No. 71,462

2 Claims. (Cl. 292—256.65)

1

This invention relates to a snap ring locking connection for a cylinder and cylinder head and more particularly to an improved construction adapted to positively seat the cylinder head against the cylinder and to provide a totally enclosed snap ring construction which is readily accessible for disassembly.

Various types of ring connections have been proposed for assembling and locking cylinders and cylinder heads of the type, for example, employed in housing hydraulically actuated pistons. Usually, such constructions employ opposed grooves in overlapping portions of the cylinder and cylinder head with a ring adapted, when assembled, to extend into both grooves and thereby lock the cylinder head in position relative to the cylinder.

Ordinarily, rectangular grooves and a rectangular snap ring are employed with one of the grooves of sufficient depth to accommodate the entire snap ring during assembly operation and the snap ring being pre-stressed to extend into the opposing groove when the opposing grooves are moved into alignment. Rings of circular cross section have also been used, being inserted endwise into aligned semi-circular grooves in cylinder and cylinder head. With such arrangements any difference in the width of either of the grooves or between either of the grooves and the ring will provide a clearance permitting play in the location of the cylinder head. Such play may be destructive of oil or other auxiliary fluid seals which may be employed, and such play may also result in excessive shock loads to the ring and groove surfaces when heavy hydraulic pressures are suddenly applied.

It is the primary object of the present invention to provide a shoulder engagement between the cylinder head and cylinder and to provide cooperating tapered surfaces in the snap ring and one of the grooves adapted to provide a positive engagement between such surfaces while avoiding extreme accuracy requirements in the machining of the grooves and snap ring.

Another object is to provide a totally enclosed snap ring construction together with means for collapsing the ring for purposes of disassembly.

A further object is to provide a snap ring locking construction for cylinder and cylinder head adaptable for use with a cylinder fabricated from a plain tubular section and a cylinder head employing an equal outside diameter to that of the cylinder.

Another object is to employ a slot in the cylinder wall permitting convenient access to the

2 ends of the snap ring with a tool adapted to disengage such snap ring.

A further object is to provide a cover for such slot having a projecting lug adapted to hold the ends of the snap ring in spaced relationship and in alignment with the slot.

These and other objects will become apparent from the following detailed description of a particular embodiment of my invention and from an examination of the drawings forming a part hereof wherein:

Fig. 1 is a longitudinal sectional view of a typical hydraulic cylinder employing applicant's snap ring construction;

Fig. 2 is an end view of such cylinder partially shown in section along the line 2—2 of Fig. 1; and Fig. 3 is an enlarged fragmentary sectional view of the snap ring construction taken along the line 3—3 of Fig. 2.

With reference to these drawings it will be seen that a simple tubular cylinder wall 10 is employed, being assembled at its ends to cylinder heads 11 and 12, respectively. Since the snap ring construction for assembling and locking these heads to the cylinder wall is identical at each end, the description herein will be limited to the snap ring employed in connection with cylinder head 12. An annular groove 13 on the interior end surface of the cylinder wall 10 is provided with one tapered surface 14 and one perpendicular surface 15 relative to the axis of the cylinder. An opposing rectangular groove 16 is provided in the cylinder head 11 having perpendicular walls 17 and 18 spaced somewhat longitudinally of the cylinder from the opposing surfaces 15 and 14 when the shoulder 19 in the cylinder head 11 is in abutment with the end 20 of the cylinder 10. A snap ring 21 is provided with a tapered surface 22, matching the surface 14 of the groove 13, as well as a perpendicular surface 23. The ring 21 and groove 16 are proportioned so that when the ring is collapsed (compressed) it may be entirely accommodated within the groove 16 so as to permit the insertion of the cylinder head 11 and snap ring 21 within the end of cylinder 10.

The grooves 13 and 16 are positioned relative to each other and to the abutting surfaces 19 and 20 so that the narrow end of the snap ring 21 may partially enter the groove 13 just before the surfaces 19 and 20 come into engagement and so that about half of the snap ring 21 will extend into each of the grooves 13 and 16 when the surfaces 19 and 20 come into abutting engagement. The cooperating tapered surfaces 14 and 22 in the groove 13 and snap ring 21 will act under the expanding effort of the snap ring 21 to hold the surfaces 19 and 20 under tight abutting engagement and thereby take up all play between the cyinder 10 and cylinder head 11.

While the basic dimensions are chosen to permit the snap ring 21 to extend about equally into each of the grooves 13 and 16, it would nevertheless be operative to perform its function of locking the cylinder head 11 against the cylinder 10 if all clearance should be taken up when the snap ring 21 were on either side of such halfway position. Accordingly, tolerances in the location and size of the grooves 13, 16 and ring 21 may be employed which are easily maintained by economic production methods without incurring any danger of looseness or play between the cylinder 10 and cylinder head 11. A self-locking taper consistent with the friction coefficients of the materials employed, e. g., in the order of seven and one-half degrees, avoids any possibility of pressure in the cylinder loosening the ring.

In order to provide ready access to the ends of the snap ring 21, which are provided with notches 24 for grasping and compressing with a plier-like tool, a slot 25 is provided in the cylinder wall 10. The gap between the ends of the snap ring 21 is made just sufficient to permit the ring to be compressed within the groove 16, and the slot 25 is limited to a length just sufficient to permit the grasping of the notches 10 of the snap ring by the tool. A removable cover 26 is provided with a depending lug 27 which precludes any possible slippage of the snap ring to a position where its ends are not accessible through the slot 25.

A fluid seal such as the rubber O-ring 28 is located between the snap ring 21 and the interior of the cylinder and it will be seen that once the cylinder head 11 is positioned and locked by the snap ring 21, no relative displacement of the cylinder head 11 and cylinder 10 which might be destructive of the sealing qualities of the O-ring 28 can be encountered. It will also be seen from the above description that an extremely simple and economical construction has been provided for assembling and locking a cylinder and cylinder head in positive engagement.

While a particular preferred embodiment of our invention has been described in detail, it will be recognized that numerous modifications might be resorted to without departing from its scope as defined in the following claims.

We claim:
1. In a cylinder and cylinder head assembly, overlapping portions in said cylinder and cylinder head, opposing and substantially enclosed grooves in said overlapping surfaces, abutting surfaces in said cylinder and cylinder head adapted to engage when said grooves are in a substantially aligned position, a snap ring stressed to induce simultaneous engagement with both grooves, cooperating tapered surfaces on said snap ring and one of said grooves adapted to produce positive engagement of said abutting surfaces in response to wedging action induced by a stress in the snap ring, said ring and tapered groove being dimensioned to provide substantial clearance therebetween apart from said engaging tapered surfaces to assure wedging action sufficient to produce said abutting engagement notwithstanding commercial manufacturing tolerances in the dimensions of the respective parts and a slot through the outermost of said overlapping surfaces adapted to provide access to the ends of said snap ring, said slot being provided with a cover having a depending lug adapted to extend between the ends of said snap ring.

2. In a power cylinder and cylinder head assembly of the type subjected to repeated application and release of pressure within the cylinder, a cylinder head having a shoulder adapted to solidly axially abut the end of said cylinder, and a cylindrical portion adapted to fit within the end of said cylinder, opposed grooves in the overlapping portions of said cylinder and cylinder head, a snap ring adapted to be fully contained within one of said grooves and prestressed to induce partial entrance into the other of said grooves upon substantial alignment of the opposing grooves, said first groove and the portion of said snap ring remaining in said first groove at all times having closely mating parallel surfaces throughout substantially normal to the axis of said cylinder, and cooperating conical surfaces on another portion only of said snap ring and said other groove providing wedging contact over a substantial surface area adapted to induce substantial preloading pressure engagement between the shoulder of said cylinder head and the end of said cylinder in response to the spring action of said snap ring, said ring and said other groove being dimensioned to provide substantial clearance therebetween when fully seated apart from said engaging conical surfaces to assure wedging action sufficient to produce said preloading pressure engagement notwithstanding commercial manufacturing tolerances in the dimensions of the respective parts, said conical surfaces being provided with a self-locking angle such as to resist any tendency of internal pressure repeatedly applied and released within the cylinder to cause displacement of said snap ring.

References Cited in the file of this patent

UNITED STATES PATENTS

| Number | Name | Date |
|---|---|---|
| 1,137,085 | Riddle | Apr. 27, 1915 |
| 1,958,273 | Hutt | May 8, 1934 |
| 2,064,028 | Moyer | Dec. 15, 1936 |
| 2,086,044 | Nelson | July 6, 1937 |
| 2,299,695 | Greene | Oct. 20, 1942 |
| 2,390,445 | Mercier | Dec. 4, 1945 |
| 2,399,327 | Cullen | Apr. 30, 1946 |
| 2,502,290 | Szitar | Mar. 28, 1950 |
| 2,595,787 | Heiman | May 6, 1952 |

FOREIGN PATENTS

| Number | Country | Date |
|---|---|---|
| 45 | Netherlands | Nov. 1, 1913 |
| 594,265 | France | Sept. 9, 1925 |
| 894,783 | France | Mar. 20, 1944 |